United States Patent Office 3,488,386
Patented Jan. 6, 1970

3,488,386
PROCESS FOR RECOVERING ACETIC ACID
Fred J. Rice, Jr., Carpentersville, Ill., assignor to The Quaker Oats Company, Chicago, Ill., a corporation of New Jersey
No Drawing. Filed June 9, 1967, Ser. No. 644,823
Int. Cl. C07c 53/08, 103/10
U.S. Cl. 260—541
4 Claims

ABSTRACT OF THE DISCLOSURE

A process for recovering dry, nitrogen-free acetic acid from acetic acid solution or aqueous ammonium acetate by (a) either beginning with aqueous ammonium acetate or converting the acetic acid solution to aqueous ammonium acetate; (b) heating the aqueous ammonium acetate within the critical temperature range of from 175° C. to 189° C. (pot temperature) to remove the ammonia and water and to produce a fraction free of ammonium acetate; (c) reducing the temperature to a temperature below the highest temperature of the above step and above the minimum temperature at which acetic acid can be distilled; and (d) reducing the pressure to remove dry, nitrogen-free acetic acid as a product. If a continuous process is desired, recycling the final bottoms fraction containing acetamide and acetic acid to the ammonium acetate in step (b) above.

BACKGROUND OF THE INVENTION

This invention relates to a process for recovering substantially dry, substantially nitrogen-free acetic acid from acetic acid solutions and/or aqueous ammonium acetate.

Various chemical processes produce dilute acetic acid solutions and/or aqueous ammonium acetic solutions as by-products. These solutions are usually discharged as waste or converted to low-grade acetic acid because an economical process for converting the solutions into glacial acetic acid, i.e. substantially dry, substantially nitrogen-free acetic acid, has not been heretofore available. Simple atmospheric distillation of dilute acetic acid solutions is not economical, and simple atmospheric heating of aqueous ammonium acetate does not produce a nitrogen-free acetic acid product. Heretofore, then, there has been a great need for an economical process for recovering substantially dry, substantially nitrogen-free acetic acid from dilute acetic acid solutions and/or aqueous ammonium acetate.

SUMMARY OF THE INVENTION

It is an object of this invention to provide a process wherein dilute or concentrated aqueous acetic acid solutions and/or aqueous ammonium acetate can be converted into substantially dry, substantially nitrogen-free acetic acid.

The object of this invention is fulfilled by converting the acetic acid to aqueous ammonium acetate and then heating the aqueous ammonium acetate at selected critical pressure and temperature ranges in a sequential order to remove dry, nitrogen-free acetic acid.

More particularly, the object of this invention is achieved by (a) converting an acetic acid solution into aqueous ammonium acetate, (b) heating the aqueous ammonium acetate at atmospheric pressure and a pot temperature of from 175° C. to 189° C., and preferably at a pot temperature of 189° C., to remove the ammonia and water as an overhead fraction and leave an ammonium acetate-free bottoms fraction, (c) reducing the temperature to a temperature below the highest temperature in the above step (b), (i.e. below the highest pot temperature reached in the critical range of from 175° C. to 189° C.), and yet maintaining it above a temperature at which acetic acid can be removed by distillation at reduced pressure, and (d) reducing the pressure to remove substantially dry, substantially nitrogen-free acetic acid as an overhead fraction. The remaining bottoms fraction may then be recycled to the ammonium acetate for increased yields.

Both acetic acid solutions and aqueous ammonium acetate are included in this invention as raw materials because acetic acid solutions can be readily converted into aqueous ammonium acetate which is suitable for use in this process. For purposes of this invention, the term "dilute" acetic acid solution may be taken to mean aqueous solutions in which the acetic acid is a minor portion by weight. It can easily be understood, however, that the more concentrated the "dilute" starting solution is, the more economical the process will be in reaching a dry, nitrogen-free product. One commercial method, that of ion exchange and absorption-desorption, can be used to convert dilute acetic acid solutions to aqueous ammonium acetate solutions containing about 20 weight percent ammonium acetate. This and other well-known methods can be used to convert the acetic acid to aqueous ammonium acetate solutions. The aqueous ammonium acetate solutions so produced are acceptable starting materials for the process. These solutions, however, may be concentrated to a much higher degree, if desired, for use as a starting material. One such method of concentrating aqueous ammonium acetate is admixing it with any compound that will form a convenient azeotrope with water in the temperature range of the process and then removing the water by azeotropic distillation. Benzene and toluene are particularly suitable as compounds that will form the desired azeotrope with water.

When heated, and then maintained at atmospheric pressure and at a constant temperature, aqueous ammonium acetate becomes a mixture of ammonium acetate, water, acetic acid and acetamide. This relationship has been described by Noyes in the Journal of the American Chemical Society, 44, 2286 (1922). If this mixture is maintained at constant temperature and pressure for a sufficient period of time, it will become an equilibrium mixture of these components. As the temperature increases, ammonia and water are evolved as gases and the mixture shifts to give increased amounts of acetamide and decreased amounts of water and ammonium acetate. As the temperature increases to a pot temperature of about 138° C., the acetic acid concentration increases; and as the temperature increases above a pot temperature of about 138° C., the acetic acid concentration decreases. As the temperature is increased, some of each of the components are evolved as gases. Also, as the temperature is increased, gaseous ammonia is evolved and the mixture proceeds toward a new equilibrium composition. If at any point the temperature and pressure are held constant, any of these mixtures will eventually become an equilibrium mixture of the individual components there. Distillation of any ammonium acetate-water-acetic acid-acetamide mixture at reduced pressure, without other controls, results in acetic acid contaminated by nitrogen-containing products. On the other hand, distillation of the mixture at atmospheric or superatmospheric pressure yields neither dry nor nitrogen-free acetic acid as a distillate. It becomes apparent, then, that prior known methods cannot be used in recovering substantially dry, substantially nitrogen-free acetic acid from dilute acetic acid solutions and/or ammonium acetate. The temperature range of from about 175° C. to 189° C. (pot temperature) is critical because it is in this temperature range that ammonium acetate decomposes completely to give acetic acid, ammonia, water and acetamide. This temperature range is also critical because temperatures in excess of the range cause conversion of the acetamide to acetonitrile, another undesired nitrogen-containing contaminant.

This invention, therefore, may be more fully defined as a process in which the following steps are followed:

(1) Aqueous ammonium acetate is obtained either from conversion of dilute acetic acid or from some other source;

(2) The aqueous ammonium acetate is heated at atmospheric pressure and at a pot temperature of from 175° C. to 189° C., and preferably at 189° C., until the distillate no longer contains ammonia and water;

(3) The bottoms fraction from the above step is cooled to reduce the temperature below the highest temperature reached in the above step (2) and the temperature is at all times maintained below the highest temperature reached in the above step (2), and at the same time, the temperature is always maintained above the temperature at which acetic acid will distill as an overhead product, and the pressure is then reduced to give dry, nitrogen-free acetic acid as an overhead product; and (4) If a continuous process is desired, the bottoms fraction from the above step is recycled to the ammonium acetate of step (1) to effect greater economics.

DESCRIPTION OF THE PREFERRED EMBODIMENTS

This invention may be further explained, but is not limited by, the following examples and preferred embodiments:

Example 1

A mixture was prepared containing about 70 mole percent acetamide, 25 mole percent acetic acid, and 5 mole percent ammonium acetate. This mixture was then diluted with about 4 weight percent water. The resulting mixture represented an acetamide-water-acetic acid - ammonium acetate equilibrium mixture corresponding to an aqueous ammonium acetate solution distilled at atmospheric pressure and at a pot temperature of 160° C. This mixture will hereinafter be referred to as "ammonium acetate mixture." This example is not in accordance with this invention, nor is it a preferred embodiment of this invention.

Example 2

An "ammonium acetate mixture" was prepared in accordance with Example 1. This mixture was distilled at atmospheric pressure and at pot temperatures up to 210° C. to recover acetic acid as an overhead product. The acetic acid was analyzed and found to be contaminated with acetonitrile and water. This example illustrates that simple atmospheric distillation of an aqueous ammonium acetate solution above a pot temperature range of from about 175° C. to 189° C. provides an acetic acid product that is not dry or nitrogen-free. This example is not in accordance with this invention nor is it a preferred embodiment of this invention.

Example 3

An "ammonium acetate mixture" was prepared in accordance with Example 1. This mixture was then distilled at pot temperatures up to 189° C. and at a reduced pressure of 50 mm. Hg to recover acetic acid as an overhead product. The acetic acid product was analyzed and found to be contaminated with ammonium acetate and water. This example illustrates that distillation of aqueous ammonium acetate solutions at temperatures up to 189° C. and at reduced pressure does not result in a dry, nitrogen-free acetic acid product. This example is not in accordance with this invention nor is it a preferred embodiment of this invention.

Example 4

An "ammonium acetate mixture" was prepared in accordance with Example 1. The mixture was distilled at atmospheric pressure and at a pot temperature of 189° C. until the overhead fraction was free of ammonia and water. The pot temperature was then reduced below 189° C. (i.e. at temperatures down to 47° C. overhead temperature) and at all times thereafter maintained below 189° C. (i.e. at temperatures down to 47° C. overhead temperature). The pressure was then reduced to 50 mm. Hg to collect acetic acid as an overhead product. The bottoms product was collected and saved for later work. The acetic acid was analyzed and found to be 99.6% by weight acetic acid with only trace amounts of acetamide and water. The product sample was then compared to a sample of glacial acetic acid (Reagent Grade, A. C. S. Specification). The product sample was found to have a lower nitrogen content than the sample of glacial acetic acid and substantially the same water content as the glacial acetic acid. Also, the refractive index, $n^{26}/D$, of the sample was found to be 1.3702 as compared to 1.3700 for the sample of glacial acetic acid, the difference being within testing error.

Example 5

The bottoms product collected in Example 4 was admixed with an "ammonium acetate mixture" prepared in accordance with Example 1. The procedure of Example 4 was then followed to collect acetic acid as an overhead product. The acetic acid product was found to be above 99.6 percent by weight acetic acid with only trace amounts of acetamide and water present. This product was also analyzed and found to have about the same physical properties and purity as the product of Example 4. This again indicates that the product as herein produced has a purity equal to or better than glacial acetic acid. It is thus seen that the process as illustrated by this example produces a substantially dry, substantially nitrogen-free acetic acid product. This example is in accordance with this invention and is a preferred embodiment of this invention.

Example 6

A dilute acetic acid solution was passed through a weak base ion-exchange resin and subsequently eluted as a 20 weight percent solution of aqueous ammonium acetate. The aqueous ammonium acetate solution was distilled at atmospheric pressure and at a pot temperature of 160° C. The bottoms product was then analyzed and found to correspond to the "ammonium acetate mixture" produced in accordance with Example 1. The mixture was then divided into two parts and Examples 4 and 5 were repeated using the individual parts as starting material. The result, in each instance, was a substantially dry, substantially nitrogen-free acetic acid product corresponding to the acetic acid products in Examples 4 and 5. It is thus seen that the process as illustrated herein can be accomplished by using either dilute acetic acid or aqueous ammonium acetate as a starting material. This example is in accordance with this invention and is a preferred embodiment of this invention.

Example 7

An "ammonium acetate mixture" was prepared in accordance with Example 1. About 3 parts by weight benzene were added to 8 parts by weight of the "ammonium acetate mixture." The resulting mixture was distilled at atmospheric pressure and the distillate was collected and allowed to separate into a benzene phase and a water phase. An amount of water equal to about 35 percent by weight of the "ammonium acetate mixture" was then removed and discarded, and the remaining distillate was returned to the bottoms mixture. The bottoms mixture was then processed in the same manner as the "ammonium acetate mixture" was processed in Example 4. The resulting product was a substantially dry, substantially nitrogen-free acetic acid. Again, this product was found to be of a purity equal to a sample of Reagent Grade glacial acetic acid (e.g., refractive index $n^{26}/D=1.3702$ as compared to 1.3700 for the sample of glacial acetic acid, the difference being within testing error). Water and nitrogen analysis of the acetic acid product indicated that the product was at least as free from water and nitrogen as the glacial acetic acid.

This example is in accordance with this invention and is a preferred embodiment of the invention.

Example 8

Example 7 was followed by the exception that toluene was substituted for the benzene. Again the product was substantially dry and nitrogen-free. The acetic acid was of a purity equal to that of Example 7.

This example is in accordance with this invention and is a preferred embodiment of the invention.

The process as described by this invention is clearly shown to provide substantially dry, substantially nitrogen-free acetic acid where prior known methods of concentrating acetic acid have failed to provide such a product. This invention, therefore, provides a new and useful method for recovering substantially dry, substantially nitrogen-free acetic acid from dilute acetic acid solutions and/or aqueous ammonium acetate.

I claim:
1. The process for recovering substantially dry, substantially nitrogen-free acetic acid from aqueous ammonium acetate comprising the steps:
  (a) heating the aqueous ammonium acetate at substantially atmospheric pressure and at a pot temperature of from 175° C. to 189° C. to remove ammonia and water as a distillate and leave as a bottoms fraction a mixture substantially free of ammonium acetate, said distillation being continued until the distillate is substantially free of ammonia and water;
  (b) reducing the temperature and maintaining the temperature below the highest temperature reached in step (a), and maintaining the temperature at a temperature at which acetic acid can be removed as an ovehread fraction in a reduced pressure distillation, and reducing the pressure to remove substantially dry, substantially nitrogen-free acetic acid as an overhead fraction.

2. The process for recovering substantially dry, substantially nitrogen-free acetic acid from dilute acetic acid solutions comprising the steps:
  (a) converting the dilute acetic acid solution into aqueous ammonium acetate;
  (b) heating the aqueous ammonium acetate at substantially atmospheric pressure and at a pot temperature of from 175° C. to 189° C. to remove ammonia and water as a distillate and leave as a bottoms fraction a mixture substantially free of ammonium acetate, said distillation being continued until the distillate is substantially free of ammonia and water;
  (c) reducing the temperature and maintaining the temperature below the highest temperature reached in step (b), and maintaining the temperature at a temperature at which acetic acid can be removed as an overhead fraction in a reduced pressure distillation, and reducing the pressure to remove substantially dry, substantially nitrogen-free acetic acid as an overhead fraction.

3. The continuous process for recovering substantially dry, substantially nitrogen-free acetic acid from aqueous ammonium acetate comprising the steps:
  (a) heating the aqueous ammonium acetate at substantially atmospheric pressure and at a pot temperature of from 175° C. to 189° C. to remove ammonia and water as a distillate and leave as a bottoms fraction a mixture substantially free of ammonium acetate, said distillation being continued until the distillate is substantially free of ammonia and water;
  (b) reducing the temperature and maintaining the temperature below the highest temperature reached in step (a), and maintaining the temperature at a temperature at which acetic acid can be removed as an overhead fraction in a reduced pressure distillation, and reducing the pressure to remove substantially dry, substantially nitrogen-free acetic acid as an overhead fraction and leave as a bottoms fraction a mixture comprising acetamide and acetic acid;
  (c) recycling the bottoms fraction mixture comprising acetamide and acetic acid from step (b) to the ammonium acetate of step (a).

4. The continuous process for recovering substantially dry, substantially nitrogen-free acetic acid from dilute acetic acid solutions comprising the steps:
  (a) converting the dilute acetic acid solution into aqueous ammonium acetate;
  (b) heating the aqueous ammonium acetate at substantially atmospheric pressure and at a pot temperature of from 175° C. to 189° C. to remove ammonia and water as a distillate and leave as a bottoms fraction a mixture substantially free of ammonium acetate, said distillation being continued until the distillate is substantially free of ammonia and water;
  (c) reducing the temperature and maintaining the temperature below the highest temperature reached in step (b), and maintaining the temperature at temperature at which acetic acid can be removed as an overhead fraction in a reduced pressure distillation, and reducing the pressure to remove substantially dry, substantially nitrogen-free acetic acid as an overhead fraction and leave as a bottoms fraction a mixture comprising acetamide and acetic acid;
  (d) recycling the bottoms fraction mixture comprising acetamide and acetic acid from step (c) to the ammonium acetate of step (b).

References Cited

UNITED STATES PATENTS 3,262,963  7/1966  Modiano et al. _____ 260—541

FOREIGN PATENTS 445,108  4/1936  Great Britain.

OTHER REFERENCES

Noyes, J.A.C.S., 44, 2286 (1922).

LORRAINE A. WEINBERGER, Primary Examiner

V. GARNER, Assistant Examiner

U.S. Cl. X.R.

260—465.2, 561